US009990045B2

(12) United States Patent
Long (10) Patent No.: US 9,990,045 B2
(45) Date of Patent: Jun. 5, 2018

(54) METHOD AND APPARATUS FOR DETECTING HAND GESTURES WITH A HANDHELD CONTROLLER

(71) Applicant: Oculus VR, LLC, Menlo Park, CA (US)

(72) Inventor: Clare Regimbal Long, Edmonds, WA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days. days.

(21) Appl. No.: 14/939,470

(22) Filed: Nov. 12, 2015

(65) Prior Publication Data

US 2017/0139481 A1    May 18, 2017

(51) Int. Cl.
*G06F 3/01*    (2006.01)
*G06F 3/0338*    (2013.01)

(52) U.S. Cl.
CPC ............ *G06F 3/017* (2013.01); *G06F 3/0338* (2013.01); *G06F 2203/0334* (2013.01)

(58) Field of Classification Search
None
See application file for complete search history.

(56) References Cited

U.S. PATENT DOCUMENTS

| | | |
|---|---|---|
| 4,518,164 A | 5/1985 | Hayford, Jr. et al. |
| 4,552,360 A | 11/1985 | Schenck et al. |
| 5,087,825 A | 2/1992 | Ingraham et al. |
| 5,181,009 A | 1/1993 | Perona |
| 5,207,426 A | 5/1993 | Inoue et al. |
| 5,265,009 A | 11/1993 | Colavita et al. |
| 5,421,590 A | 6/1995 | Robbins et al. |
| D363,320 S | 10/1995 | Barthelemy et al. |
| 5,479,163 A | 12/1995 | Samulewicz |
| 5,551,701 A | 9/1996 | Bouton et al. |
| 5,616,078 A | 4/1997 | Oh et al. |
| 5,645,277 A | 7/1997 | Cheng |
| 5,796,354 A | 8/1998 | Cartabiano et al. |
| 5,982,355 A | 11/1999 | Jaeger et al. |
| 6,173,203 B1 | 1/2001 | Barkley et al. |
| 6,192,253 B1 | 2/2001 | Charlier et al. |
| 6,430,110 B2 | 8/2002 | Baroche |
| 6,544,124 B2 | 4/2003 | Woodward et al. |

(Continued)

OTHER PUBLICATIONS

U.S. Appl. No. 14/934,073 by Long, C., et al., filed Nov. 5, 2015.

(Continued)

*Primary Examiner* — Nicholas J Lee
*Assistant Examiner* — Duane N Taylor, Jr.
(74) *Attorney, Agent, or Firm* — FisherBroyles, LLP (57) ABSTRACT

A method for detecting a user's hand gestures with a handheld controller. The method includes monitoring a first sensor and a second sensor. Each sensor is capable of sensing the presence of the user's thumb. The method further includes sensing the presence of the thumb on the first sensor and then sensing when the thumb is no longer present on the first sensor. A time period is monitored beginning when the thumb is no longer present on the first sensor and ending when the presence of the thumb is sensed on one of the first sensor and the second sensor. Once the time period exceeds a threshold time value, a thumbs-up gesture is registered.

15 Claims, 4 Drawing Sheets

(56) References Cited

U.S. PATENT DOCUMENTS

| | | |
|---|---|---|
| 6,572,108 B1 | 6/2003 | Bristow |
| 6,590,835 B2 | 7/2003 | Farine et al. |
| 6,652,383 B1 | 11/2003 | Sonoda et al. |
| 6,970,157 B2 | 11/2005 | Siddeeq et al. |
| 7,004,469 B2 | 2/2006 | von Goeben et al. |
| 7,106,197 B2 | 9/2006 | Gaiotto et al. |
| 7,331,793 B2 | 2/2008 | Hernandez et al. |
| 7,345,670 B2 | 3/2008 | Armstrong et al. |
| 8,064,972 B2 | 11/2011 | Russo et al. |
| D656,996 S | 4/2012 | Mikhailov et al. |
| 8,188,842 B2 | 5/2012 | Otsuka et al. |
| 8,267,786 B2 | 9/2012 | Ikeda |
| 8,439,753 B2 | 5/2013 | Nagata et al. |
| 8,795,078 B1* | 8/2014 | Musick, Jr. ............ G06F 3/0346 463/37 |
| 8,882,596 B2 | 11/2014 | Takahashi et al. |
| 8,994,643 B2 | 3/2015 | Goodwin et al. |
| 9,141,087 B2 | 9/2015 | Brown et al. |
| 9,386,662 B1 | 7/2016 | Krueger et al. |
| 9,421,472 B2 | 8/2016 | Buller et al. |
| 9,678,566 B2 | 6/2017 | Webb et al. |
| D795,959 S | 8/2017 | Hubler et al. |
| D800,841 S | 10/2017 | Hubler et al. |
| 9,804,693 B2 | 10/2017 | Long |
| D802,055 S | 11/2017 | Chen et al. |
| 9,839,840 B2 | 12/2017 | Long et al. |
| 2001/0015718 A1 | 8/2001 | Hinckley et al. |
| 2001/0045938 A1 | 11/2001 | Willner et al. |
| 2002/0072415 A1 | 6/2002 | Kikukawa et al. |
| 2003/0100367 A1 | 5/2003 | Cooke et al. |
| 2004/0222963 A1 | 11/2004 | Guo et al. |
| 2004/0222970 A1 | 11/2004 | Martinez et al. |
| 2005/0248544 A1 | 11/2005 | Adam et al. |
| 2005/0255915 A1 | 11/2005 | Riggs et al. |
| 2006/0287089 A1 | 12/2006 | Addington et al. |
| 2007/0049374 A1 | 3/2007 | Ikeda et al. |
| 2007/0066394 A1 | 3/2007 | Ikeda et al. |
| 2007/0084293 A1 | 4/2007 | Kaiserman et al. |
| 2007/0293318 A1 | 12/2007 | Tetterington et al. |
| 2008/0261693 A1 | 10/2008 | Zalewski et al. |
| 2008/0261695 A1 | 10/2008 | Coe et al. |
| 2009/0005164 A1 | 1/2009 | Chang et al. |
| 2009/0143110 A1 | 6/2009 | Armstrong et al. |
| 2009/0149256 A1 | 6/2009 | Lui et al. |
| 2009/0290345 A1 | 11/2009 | Shaner et al. |
| 2009/0295721 A1 | 12/2009 | Yamamoto et al. |
| 2009/0298590 A1 | 12/2009 | Marks et al. |
| 2010/0009760 A1 | 1/2010 | Shimamura et al. |
| 2010/0085321 A1 | 4/2010 | Pundsack et al. |
| 2010/0118195 A1 | 5/2010 | Eom et al. |
| 2010/0144436 A1 | 6/2010 | Marks et al. |
| 2010/0184513 A1 | 7/2010 | Mukasa et al. |
| 2011/0294579 A1 | 12/2011 | Marks et al. |
| 2012/0088582 A1 | 4/2012 | Wu et al. |
| 2012/0202597 A1 | 8/2012 | Yee et al. |
| 2012/0261551 A1 | 10/2012 | Rogers et al. |
| 2013/0162450 A1 | 6/2013 | Leong et al. |
| 2013/0324254 A1 | 12/2013 | Huang et al. |
| 2014/0015813 A1 | 1/2014 | Numaguchi et al. |
| 2014/0141891 A1 | 5/2014 | Georgy et al. |
| 2014/0203953 A1 | 7/2014 | Moser et al. |
| 2014/0228124 A1 | 8/2014 | Plagge et al. |
| 2014/0273546 A1 | 9/2014 | Harmon et al. |
| 2014/0361977 A1 | 12/2014 | Mao et al. |
| 2014/0362110 A1 | 12/2014 | Stafford |
| 2014/0364212 A1 | 12/2014 | Osman et al. |
| 2014/0378227 A1 | 12/2014 | Lee |
| 2015/0077398 A1* | 3/2015 | Yairi ............ G06F 3/016 345/175 |
| 2015/0094142 A1 | 4/2015 | Stafford |
| 2015/0155445 A1 | 6/2015 | Crowder et al. |
| 2015/0234477 A1 | 8/2015 | Watson et al. |
| 2015/0253574 A1 | 9/2015 | Thurber |
| 2015/0258431 A1 | 9/2015 | Strafford et al. |
| 2015/0258432 A1 | 9/2015 | Tokubo et al. |
| 2015/0268920 A1* | 9/2015 | Schapiro ............ G06F 3/162 700/94 |
| 2015/0370320 A1 | 12/2015 | Connor et al. |
| 2016/0351362 A1 | 12/2016 | Gassoway et al. |
| 2016/0357249 A1 | 12/2016 | Webb et al. |
| 2016/0357261 A1 | 12/2016 | Webb et al. |
| 2016/0361637 A1 | 12/2016 | Bristol et al. |
| 2016/0361638 A1 | 12/2016 | Rogoza et al. |
| 2016/0363996 A1 | 12/2016 | Rogoza et al. |
| 2016/0364910 A1 | 12/2016 | Katz et al. |
| 2017/0128828 A1 | 5/2017 | Long |
| 2017/0131767 A1 | 5/2017 | Long |
| 2017/0136351 A1 | 5/2017 | Long |
| 2017/0168303 A1 | 6/2017 | Petrov et al. |
| 2017/0177102 A1 | 6/2017 | Long et al. |
| 2017/0189798 A1 | 7/2017 | Rogoza et al. |
| 2017/0189799 A1 | 7/2017 | Anderson et al. |
| 2017/0189802 A1 | 7/2017 | Rogoza et al. |
| 2017/0192495 A1 | 7/2017 | Drinkwater et al. |
| 2017/0192506 A1 | 7/2017 | Andersen et al. |

OTHER PUBLICATIONS

U.S. Appl. No. 14/934,090 by Long, C., et al., filed Nov. 5, 2015.
U.S. Appl. No. 14/939,431 by Long, C., et al., filed Nov. 12, 2015.
U.S. Appl. No. 14/975,049 by Long, C., et al., filed Dec. 18, 2015.
U.S. Appl. No. 29/529,915 by Chen, Y., et al., filed Jun. 11, 2015.
U.S. Appl. No. 29/571,025 by Chen, Y., et al., filed Jul. 13, 2016.
U.S. Appl. No. 29/571,027 by Chen, Y., et al., filed Jul. 13, 2016.
U.S. Appl. No. 29/571,030 by Chen, Y., et al., filed Jul. 13, 2016.
U.S. Appl. No. 14/991,875 by Drinkwater, J., et al., filed Jan. 8, 2016.
U.S. Appl. No. 15/172,099 by Rogoza, B., et al., filed Jun. 2, 2016.
U.S. Appl. No. 15/173,474 by Rogoza, B., et al., filed Jun. 3, 2016.
U.S. Appl. No. 15/173,558 by Andersen, B., et al., filed Jun. 3, 2016.
U.S. Appl. No. 15/177,121 by Anderson, B., et al., filed Jun. 2, 2016.
U.S. Appl. No. 29/579,091 by Chen, Y., et al., filed Sep. 27, 2016.
Notice of Allowance dated Jun. 29, 2016, for U.S. Appl. No. 29/529,915 by Chen, Y., et al., filed Jun. 11, 2015.
Restriction Requirement dated Apr. 8, 2016, for U.S. Appl. No. 29/529,915 by Chen, Y., et al., filed Jun. 11, 2015.
Notice of Allowance dated Sep. 27, 2016, for U.S. Appl. No. 29/529,915 by Chen, Y., et al., filed Jun. 11, 2015.
Non-Final Office Action dated Mar. 23, 2017 for U.S. Appl. No. 14/934,073 by Long, C., et al., filed Nov. 5, 2015.
Non-Final Office Action dated Apr. 7, 2017 for U.S. Appl. No. 14/975,049 by Long, C., et al., filed Dec. 18, 2015.
Ex Parte Quayle Action dated May 5, 2017 for U.S. Appl. No. 29/571,027 by Chen, Y., et al., filed Jul. 13, 2016.
Ex Parte Quayle Action dated May 5, 2017 for U.S. Appl. No. 29/571,030 by Chen, Y., et al., filed Jul. 13, 2016.
Ex Parte Quayle Action dated May 8, 2017 for U.S. Appl. No. 29/571,025 by Chen, Y., et al., filed Jul. 13, 2016.
Notice of Allowance dated Jun. 15, 2017 of U.S. Appl. No. 29/571,030 by Chen, Y., et al., filed Jul. 13, 2016.
Notice of Allowance dated Jun. 21, 2017 for U.S. Appl. No. 29/571,025 by Chen, Y., et al., filed Jul. 13, 2016.
Notice of Allowance dated Jun. 22, 2017 for U.S. Appl. No. 29/571,027 by Chen, Y., et al., filed Jul. 13, 2016.
Supplemental Notice of Allowability dated Jul. 10, 2017 of U.S. Appl. No. 29/571,030 by Chen, Y., et al., filed Jul. 13, 2016.
Supplemental Notice of Allowability dated Jul. 6, 2017 for U.S. Appl. No. 29/571,025 by Chen, Y., et al., filed Jul. 13, 2016.
Non-Final Office Action dated Jul. 17, 2017 for U.S. Appl. No. 14/939,431 by Long, C., et al., filed Nov. 12, 2015.
Non-Final Office Action dated Aug. 24, 2017 for U.S. Appl. No. 14/991,875 by Drinkwater, J., et al., filed Jan. 8, 2016.
Notice of Allowance dated Sep. 15, 2017 for U.S. Appl. No. 14/975,049 by Long, C. et al., filed Dec. 15, 2015.
U.S. Appl. No. 29/611,924 by Chen, Y., et al., filed Jul. 26, 2017.
Notice of Allowance dated Dec. 22, 2017 for U.S. Appl. No. 14/991,875 by Drinkwater, J., et al., filed Jan. 8, 2016.
"STEM System" accessed and printed from URL <http://sixense.com/wireless>, 5 pages.

(56) References Cited

OTHER PUBLICATIONS

Final Office Action dated Nov. 2, 2017 for U.S. Appl. No. 14/934,073 by Long, C., et al., filed Nov. 5, 2015.
Notice of Allowance dated Oct. 20, 2017 for U.S. Appl. No. 14/934,090 by Long, C., et al., filed Nov. 5, 2015.
Restriction Requirement dated Oct. 12, 2017 for U.S. Appl. No. 29/579,091 by Chen, Y., et al., filed Sep. 27, 2016.
Supplemental Notice of Allowability dated Sep. 29, 2017 for U.S. Appl. No. 29/571,027 by Chen, Y., et al., filed Jul. 13, 2016.
Tested, "Hands-On with Sixense STEM VR Motion-Tracking System" accessed and printed from URL <https://www.youtube.com/watch?v=C8z-On6FBTM>, 5 pages.
Non-Final Office Action dated Nov. 1, 2017 for U.S. Appl. No. 15/173,558 by Andersen, B., et al., filed Jun. 3, 2016.

\* cited by examiner

METHOD AND APPARATUS FOR DETECTING HAND GESTURES WITH A HANDHELD CONTROLLER

TECHNICAL FIELD

This patent application is directed to handheld controllers and, more specifically, to virtual reality handheld controllers.

BACKGROUND

In a virtual reality system, a user wears a head-mounted display that presents a selected virtual reality (VR) environment in front of the user's eyes. In some VR systems, a user can manipulate items in the virtual environment with handheld controllers. The controllers include tracking patterns comprised of a pattern of lights, for example. The system monitors the movement of the tracking patterns with a tracking camera and reproduces the user's hand movements in the virtual environment. However, buttons traditionally used on game controllers, for example, do not typically detect detailed hand movements. For example, individual finger movements and gestures, as well as opened or closed hand movements, are not captured with traditional button configurations.

BRIEF DESCRIPTION OF THE DRAWINGS

Embodiments of the methods and apparatus for detecting a user's hand gestures introduced herein may be better understood by referring to the following Detailed Description in conjunction with the accompanying drawings, in which like reference numerals indicate identical or functionally similar elements.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

A method for detecting a user's hand gestures with a handheld controller is disclosed. In an embodiment, the method includes monitoring a first sensor and a second sensor. Each sensor is capable of sensing the presence of the user's thumb. The method further includes sensing the presence of the thumb on the first sensor and then sensing when the thumb is no longer present on the first sensor. A time period is monitored beginning when the thumb is no longer present on the first sensor and ending when the presence of the thumb is sensed on one of the first sensor and the second sensor. Once the time period exceeds a threshold time value, a thumbs-up gesture is registered.

A handheld controller operative to detect a user's hand gestures is also disclosed. In an embodiment, the handheld controller comprises a main body and a handle extending from the main body. A first sensor is disposed on the main body capable of sensing the presence of a user's finger. The controller also includes a second sensor capable of sensing the presence of the finger. A processor monitors the first and second sensors. The processor registers when the first sensor senses the presence of the finger and also registers when the finger is no longer sensed on the first sensor. The processor monitors a time period beginning when the finger is no longer sensed on the first sensor and ending when the presence of the finger is sensed on one of the first sensor and the second sensor. When the time period exceeds a threshold time value, the processor registers a gesture, such as a thumbs-up gesture.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Figure 1:
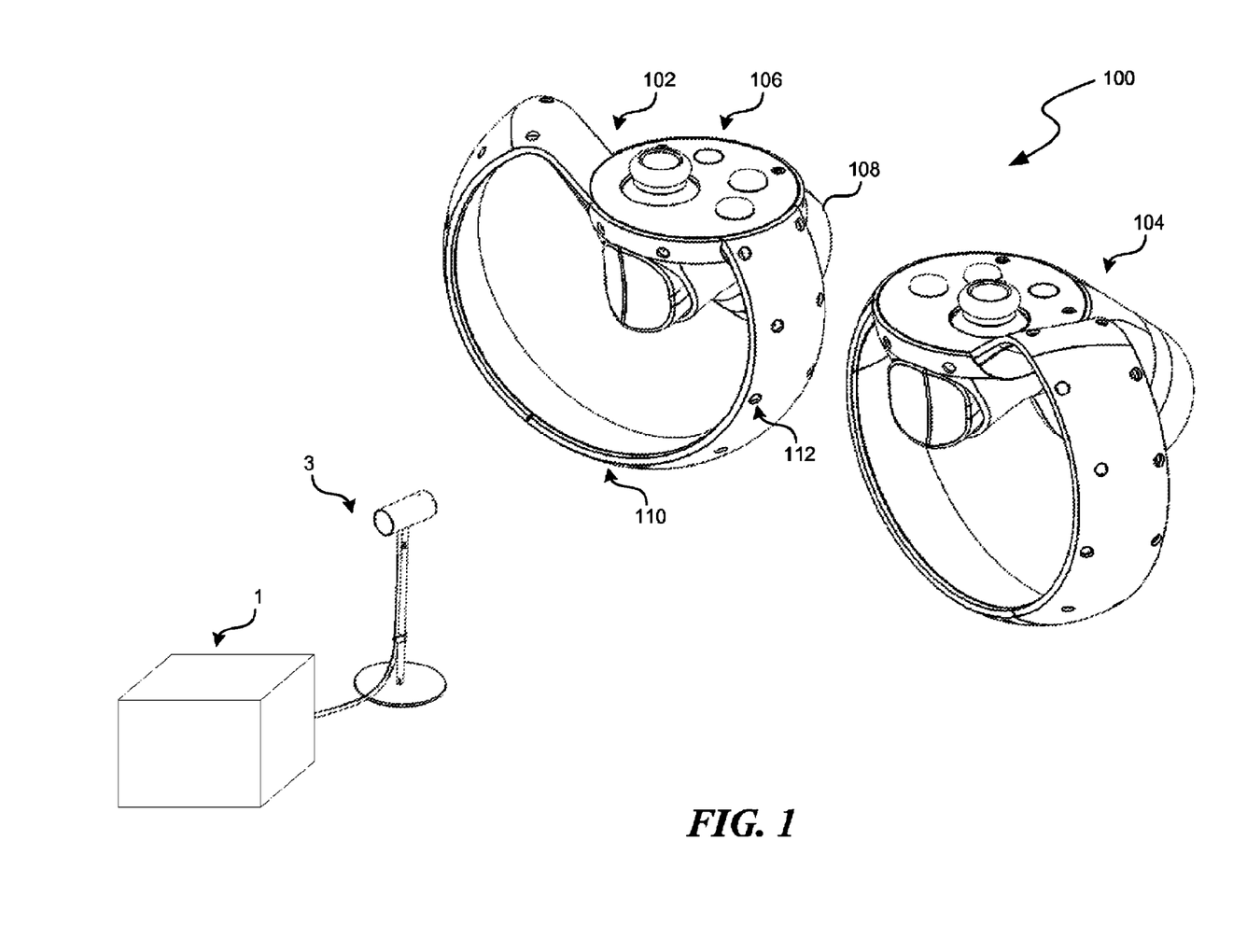
FIG. 1 is an isometric view of a pair of handheld controllers each operative to detect a user's hand gestures according to a representative embodiment.

FIG. 1 illustrates a pair of handheld controllers 100 according to a representative embodiment. The pair of handheld controllers 100 includes a right-hand controller 102 and a left-hand controller 104. The primary structure of the right-hand controller 102 and the left-hand controller 104 when held adjacent to each other in a similar orientation, as illustrated, are substantially symmetric with respect to each other. Both controllers 102/104 are described herein with respect to the right-hand controller 102, as both controllers include the same or similar features, albeit in mirror image. The right-hand controller 102 includes a main body 106 and a handle 108 extending from the main body 106. In some embodiments, a surrounding ring portion 110 extends from the main body 106. The controllers 102/104 can be part of a VR system 1, such as the Rift™ available from Oculus™. Each of the controllers 102/104 includes a plurality of tracking features positioned in a corresponding tracking pattern, such as the right-hand controller's tracking pattern 112. The tracking features in the tracking patterns are configured to be accurately tracked by a tracking camera 3 to determine the motion, orientation, and/or spatial position of the controller for reproduction in a virtual environment. The tracking features can include, for example, fiducial markers or light emitting diodes (LED).

Figure 2A:
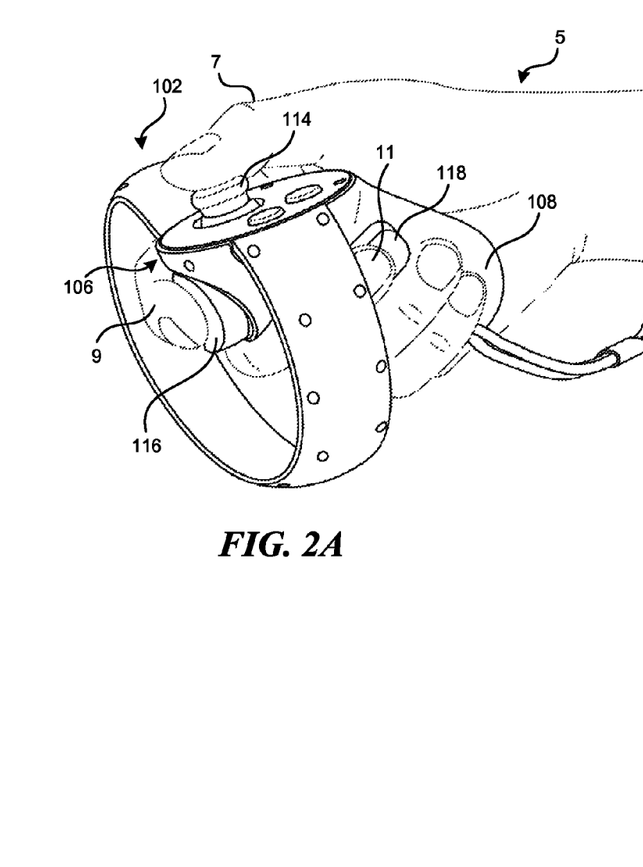
FIG. 2A is an isometric view of a user's right hand grasping the right-hand controller of FIG. 1.
Figure 2B:
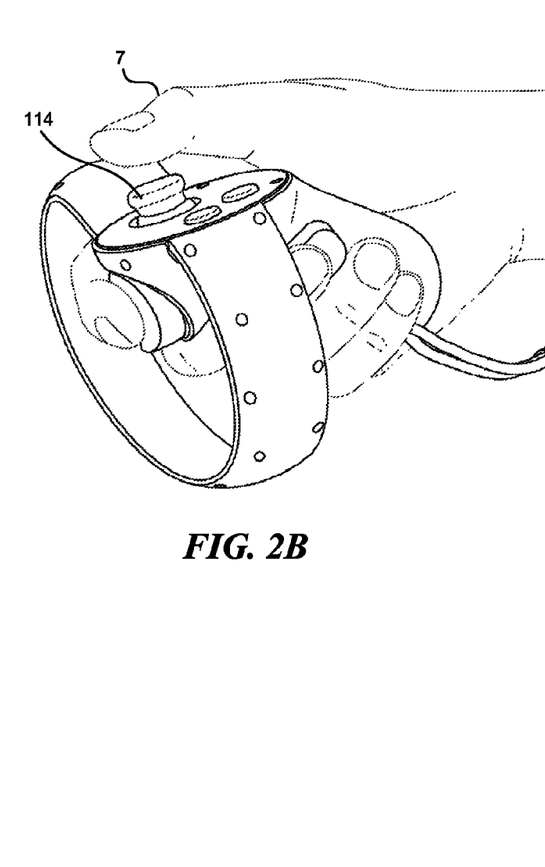
FIG. 2B is an isometric view of the right-hand controller as shown in FIG. 2A with the user's thumb in a thumbs-up gesture.

As shown in FIG. 2A, the handle portion 108 of the right-hand controller 102 is grasped by a user's right hand 5. When the controller 102 is grasped, the user's thumb 7 (i.e., the user's first finger) is positioned above the main body 106 and rests on a thumbstick 114. The user's second or index finger 9 is positioned on a trigger button 116. The user's third or middle finger 11 is positioned to contact a third finger button 118 on the handle portion 108. The controllers 102 and 104 are configured to detect a user's hand and/or finger gestures, such as a thumbs-up gesture as shown in FIG. 2B. As described more fully below, a thumbs-up gesture is indicated when the user removes his or her thumb 7 from the thumbstick 114 for a threshold period of time without touching the same or another button. Although, the various embodiments are described with respect to a thumbs-up gesture, other hand and/or finger gestures can be detected with the disclosed technology. For example, a pointing gesture can be detected with the trigger button 116. A hand or finger gesture, such as an open hand, can be detected with the third finger button 118. The presence of a gesture can be a signal to the VR system to initiate a command or to include the gesture in a corresponding apparition or avatar.

Figure 3:
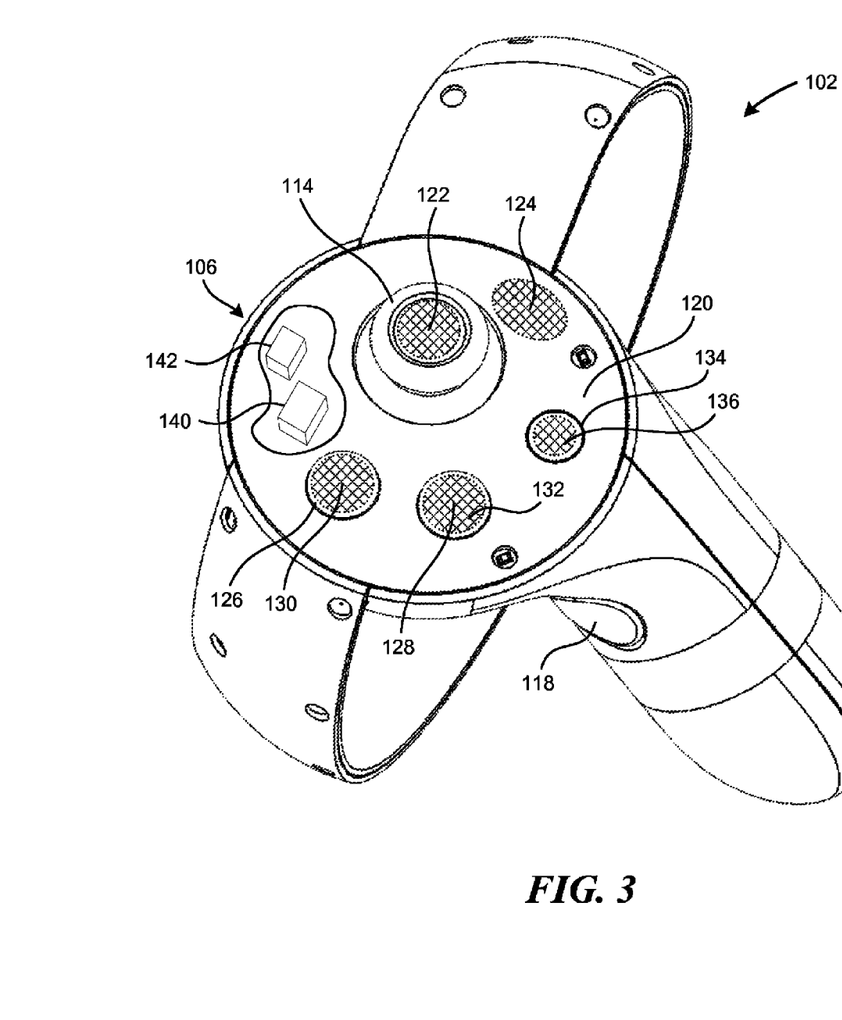
FIG. 3 is an isometric view of the right-hand controller shown in FIGS. 1-2B as viewed from the top of the controller.

With further reference to FIG. 3, the main body 106 of the right-hand controller 102 includes a thumb surface 120 from which the thumbstick 114 extends. The thumbstick 114 can include a thumb sensor 122 to detect the presence of the user's thumb or other finger. The presence of a finger can include touching the sensor or hovering over the sensor within a selected distance. In some embodiments, the thumb sensor 122 can be a capacitive touch sensor. The thumb surface 120 can include a capacitive-touch sensor area 124 positioned next to the thumbstick 114 in order to detect when a user is resting their thumb on the thumb surface 120. In some embodiments, the entire thumb surface 120 is a capacitive touch sensor. The thumb surface 120 may include additional buttons 126, 130, and 134, each of which may include a capacitive touch sensor 128, 132, and 136, respectively. A hand gesture, such as a thumbs-up gesture, can be detected when the user lifts their thumb off of a first sensor, such as the thumb sensor 122, and does not place it on the first sensor or a second sensor, such as the sensor area 124, for a selected threshold period of time. It should be understood that a touch sensor can comprise either a capacitive touch sensor or a push button, such as one of the buttons 126, 130, and 134. In some embodiments, the trigger button 116 (see FIG. 2A) and the third finger button 118 can each include a capacitive touch sensor to facilitate finger and gesture detection according to the disclosed techniques. The third finger button 118 is described further in U.S. patent application Ser. No. 14/939,431 titled "HANDHELD CONTROLLER WITH THIRD FINGER GRIP DETECTION," which is hereby incorporated by reference in its entirety.

In some embodiments, the controller 102 includes an inertial measurement unit (IMU) 142 to monitor rotation and orientation of the controller. Thus, if the user makes a thumbs-up gesture and the IMU 142 determines that the user's hand has been rotated, then the registered hand gesture can be modified to represent a thumbs-down gesture, for example. In some embodiments, the controller 102 includes a processor or microcontroller 140 to perform the timing and monitoring of the buttons (114, 116, 118, 126, 130, 134), sensors (122, 124, 128, 132, 136), and IMU 142. In other embodiments, a computer included in the VR system 1 (see FIG. 1) can be used to monitor the buttons, sensors, and IMU 142 and to determine the hand gesture indicated by the sensors and buttons. In some embodiments, the rotation and orientation of the handheld controller is determined by the IMU 142 and/or by monitoring the tracking pattern 112 with the tracking camera 3 (see FIG. 1).

Figure 4:
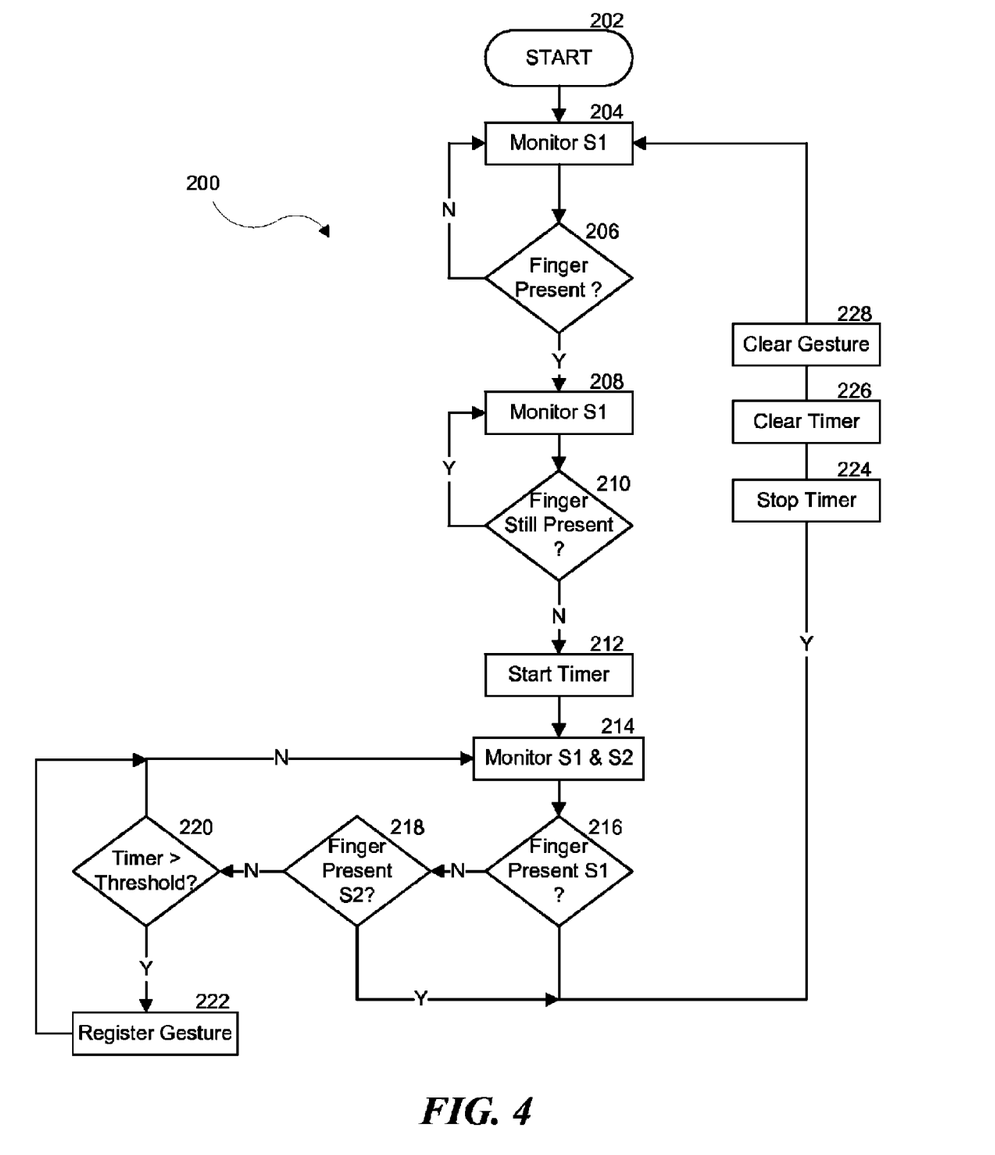
FIG. 4 is a flowchart illustrating a representative method for detecting a user's hand gestures.

FIG. 4 illustrates a representative method for determining a hand gesture with a handheld controller as described above. The method 200 starts at 202 where a first sensor S1, such as the thumb sensor 122, is monitored at step 204. At step 206, a determination is made as to whether a finger, such as a thumb, is present on the first sensor S1. If there is still no finger present on the first sensor S1 at step 206, then the first sensor S1 continues to be monitored and returns back to step 204. If a finger is present on the first sensor S1, the method moves to step 208.

If a finger is detected at step 206, the method moves to step 208 where again the first sensor S1 is monitored to determine if the finger remains present or is removed from the sensor. Thus, a determination is made at step 210 if the finger is still present on the sensor. If the finger is still present on the sensor, then at step 208 the sensor continues to be monitored. However, if there is no longer a finger present on the sensor (i.e., the user has removed their thumb or other finger from the sensor), a timer is started at step 212.

Once the timer is started at step 212, the first sensor S1 and one or more second sensors S2, such as any of the buttons (114, 116, 118, 126, 130, 134) or sensors (122, 124, 128, 132, 136), are monitored at step 214 to determine if the user puts their thumb down onto a sensor. Thus, at step 216, a determination is made as to whether the finger is present on the first sensor S1. If there is not a finger present on the first sensor S1, then a determination is made at step 218 as to whether the finger is present at a second sensor S2. If there is no finger present on sensor S2, then a check is made at step 220 to determine if the timer has exceeded a threshold time value. If the timer has exceeded the threshold time value, a gesture is registered for use by the VR system 1. In other words, if the thumb is raised off of first sensor S1 for a selected period of time (e.g., two seconds), it is determined that the user is gesturing a thumbs-up.

Once the gesture is registered at step 222, sensors S1 and S2 continue to be monitored at step 214. Also, if the timer has not reached the threshold time value, the method returns to step 214 to continue monitoring sensors S1 and S2. If the finger is detected at either sensor S1 or sensor S2, the method resets and returns to step 204 to begin monitoring the first sensor S1 again. When the method resets, the timer is stopped at step 224, the timer is cleared at step 226, and the gesture is cleared at step 228.

In some embodiments, the registered gesture at step 222 can be modified based on the orientation of the controller such as measured by the IMU 142 or via the tracking patterns 112. For example, if the controller is rotated approximately 90 degrees from vertical, the thumbs-up gesture can be modified to indicate a sideways thumb gesture. In another example, if the controller is rotated 180 degrees from vertical, the thumb gesture can be modified to indicate a thumbs-down gesture. In some embodiments, a resting position is registered if the thumb is sensed on the second sensor S2 prior to the time period exceeding the threshold time value. In some embodiments, the trigger button 116 and third button 118 can be used to determine other hand or finger gestures, whether they be pushed or through the capacitive touch sensor.

REMARKS

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A handheld controller, comprising:
    a main body;
    a handle extending from the main body;
    a first sensor disposed on the main body capable of sensing the presence of a user's finger;
    a second sensor capable of sensing the presence of the finger; and
    a processor operative to:
        monitor the first sensor and the second sensor;
        register when the first sensor senses the presence of the finger;
        after registering the presence of the finger, register when the finger is no longer sensed on the first sensor;
        monitor a time period beginning when the finger is no longer sensed on the first sensor and ending when the presence of the finger is sensed on one of the first sensor and the second sensor; and
        initiate a command to display a gesture when the time period exceeds a threshold time value and until the finger is sensed on one of the first sensor and the second sensor.

2. The handheld controller of claim 1, wherein the main body includes a thumb surface and further comprising a thumbstick extending from the thumb surface, wherein the first sensor is disposed on the thumbstick.

3. The handheld controller of claim 2, wherein the second sensor is disposed on the thumb surface.

4. The handheld controller of claim 3, wherein the first sensor and the second sensor are capacitive sensors.

5. The handheld controller of claim 2, wherein the second sensor is a button mounted in the thumb surface.

6. The handheld controller of claim 2, wherein the second sensor is a capacitive sensor disposed on a button mounted in the thumb surface.

7. The handheld controller of claim 2, wherein the processor is housed in the main body.

8. A method for detecting a user's hand gestures with a handheld controller, the method comprising:
    monitoring a first sensor and a second sensor, each sensor capable of sensing the presence of a finger of the user;
    sensing the presence of the finger on the first sensor;
    after registering the presence of the finger, sensing when the finger is no longer present on the first sensor;
    monitoring a time period beginning when the finger is no longer present on the first sensor and ending when the presence of the finger is sensed on one of the first sensor and the second sensor; and
    displaying a gesture when the time period exceeds a threshold time value and until the finger is sensed on one of the first sensor and the second sensor.

9. The method of claim 8, further comprising registering a resting position if the finger is sensed on the second sensor prior to the time period exceeding the threshold time value.

10. The method of claim 8, further comprising sensing rotation of the handheld controller and modifying the gesture according to the sensed rotation.

11. The method of claim 10, wherein sensing rotation of the handheld controller comprises monitoring an inertial measuring unit.

12. A method for detecting a user's hand gestures with a handheld controller, the method comprising:

monitoring a first sensor and a second sensor, each sensor capable of sensing the presence of a thumb of the user;

sensing the presence of the thumb on the first sensor;

after sensing the presence of the thumb, sensing when the thumb is no longer present on the first sensor; and monitoring a time period beginning when the thumb is no longer present on the first sensor and ending when the presence of the thumb is sensed on one of the first sensor and the second sensor; and displaying a thumbs-up gesture when the time period exceeds a threshold time value and until the thumb is sensed on one of the first sensor and the second sensor.

13. The method of claim 11, further comprising registering a resting position if the thumb is sensed on the second sensor prior to the time period exceeding the threshold time value.

14. The method of claim 11, further comprising sensing rotation of the handheld controller and modifying the thumbs-up gesture according to the sensed rotation.

15. The method of claim 14, wherein the thumbs-up gesture is modified to register a thumbs-down gesture.

\* \* \* \* \*